(12) United States Patent
Chen et al.

(10) Patent No.: US 11,733,033 B2
(45) Date of Patent: Aug. 22, 2023

(54) THREE-DIMENSIONAL (3D) SENSING SYSTEM FOR DETERMINING 3D PROFILE OF OBJECT AND METHOD THEREOF

(71) Applicant: HIMAX TECHNOLOGIES LIMITED, Tainan (TW)

(72) Inventors: Wu-Feng Chen, Tainan (TW); Ching-Wen Wang, Tainan (TW); Cheng-Che Tsai, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 94 days.

(21) Appl. No.: 17/306,967

(22) Filed: May 4, 2021

(65) Prior Publication Data
US 2022/0357148 A1   Nov. 10, 2022

(51) Int. Cl.
*G01B 11/24* (2006.01)
*G02F 1/01* (2006.01)

(52) U.S. Cl.
CPC ............ *G01B 11/24* (2013.01); *G02F 1/0136* (2013.01)

(58) Field of Classification Search
CPC .............................. G01B 11/24; G02F 1/0136
USPC .......................... 356/364–370, 121–137, 250
See application file for complete search history.

(56) References Cited

U.S. PATENT DOCUMENTS

| | | | |
|---|---|---|---|
| 2019/0154809 A1* | 5/2019 | Akkaya | G01S 17/89 |
| 2021/0263347 A1* | 8/2021 | Chen | H04N 5/23212 |

* cited by examiner

*Primary Examiner* — Tri T Ton
(74) *Attorney, Agent, or Firm* — Winston Hsu

(57) ABSTRACT

A three-dimensional (3D) sensing system for determining a 3D profile of an object and a method are provided. The 3D sensing system includes a first light source, a liquid crystal lens, a light detector and a control circuit. The first light source is configured to emit polarized light with a polarization setting for projecting a structured light pattern on the object. The liquid crystal lens in a polarization state allows incident light with the polarization setting to pass through and block incident light without the polarization setting from passing through. The light detector is configured to detect light reflected from the object and passing through the liquid crystal lens. When the 3D sensing system is in a 3D mode, the control circuit is configured to turn on the first light source and control the liquid crystal lens to enter the polarization state.

6 Claims, 6 Drawing Sheets

THREE-DIMENSIONAL (3D) SENSING SYSTEM FOR DETERMINING 3D PROFILE OF OBJECT AND METHOD THEREOF

BACKGROUND OF THE INVENTION

1. Field of the Invention

The present invention is related to object detection and identification, and more particularly, to a three-dimensional (3D) sensing system and associated method for determining a 3D profile of an object under ambient light.

2. Description of the Prior Art

Nowadays, the three-dimensional (3D) sensing technology has many related applications (e.g., facial identity scan). There are different methods of 3D sensing such as Time of Flight (TOF), dual camera, structured light, etc., wherein the method of structured light is projecting a specific designed dot pattern through Vertical-Cavity Surface-Emitting Laser (VCSEL) and diffractive optical elements (DOE). Then, a processor analyzes the result of shifting of various distances between dots of the light dot pattern, to determine a depth between the dot and the camera. Through the design of DOE and adjustment of array of VCSEL, the object may also be uniformly illuminated, such that the VCSEL and the DOE are used as a two-dimensional (2D) light source. When performing facial identity scan, generally 2d photos and 3d sensing results can be used as the basis for the facial identity scan. However, under different usage scenarios and environments, the information of the light source will be affected by ambient light. For example, due to the influence of sunlight, the received information of light is covered by sunlight, such that the light dot pattern cannot be identified and analyzed. As a result, the structured light cannot accurately measure the depth of objects under strong sunlight. Thus, a novel method and associated system are needed for solving the problems without introducing any side effect or in a way that is less likely to introduce a side effect.

SUMMARY OF THE INVENTION

It is therefore an objective of the present invention to provide a 3D sensing system and a method for determining 3D profile of an object under ambient light.

At least one embodiment of the present invention provides a three-dimensional (3D) sensing system for determining a 3D profile of an object. The 3D sensing system includes a first light source, a liquid crystal lens, a light detector and a control circuit. The first light source is configured to emit polarized light with a polarization setting for projecting a structured light pattern on the object. The liquid crystal lens in a polarization state allows incident light with the polarization setting to pass through and block incident light without the polarization setting from passing through. The light detector is configured to detect light reflected from the object and passing through the liquid crystal lens. The control circuit is electrically connected to the first light source and the liquid crystal lens. When the 3D sensing system is in a 3D mode, the control circuit is configured to turn on the first light source and control the liquid crystal lens to enter the polarization state.

At least one embodiment of the present invention provides a method for determining a three-dimensional (3D) dimensional profile of an object. The method includes: in response to a 3D mode being used, turning on a first light source to emit polarized light with a polarization setting for projecting a structured light pattern on the object, and controlling a liquid crystal lens to enter a polarization state, wherein the liquid crystal lens in the polarization state allows incident light with the polarization setting to pass through and block incident light without the polarization setting from passing through; and detecting light reflected from the object and passing through the liquid crystal lens.

The present invention method and 3D sensing system can block the light without polarization setting in ambient light, to reduce the influence of ambient light on structured light. The light detector may receive the structure light with less noise, such that the depth of each dot on the object can be determined more accurately. In addition, the present invention method and associated apparatus can solve the problems of the related art without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
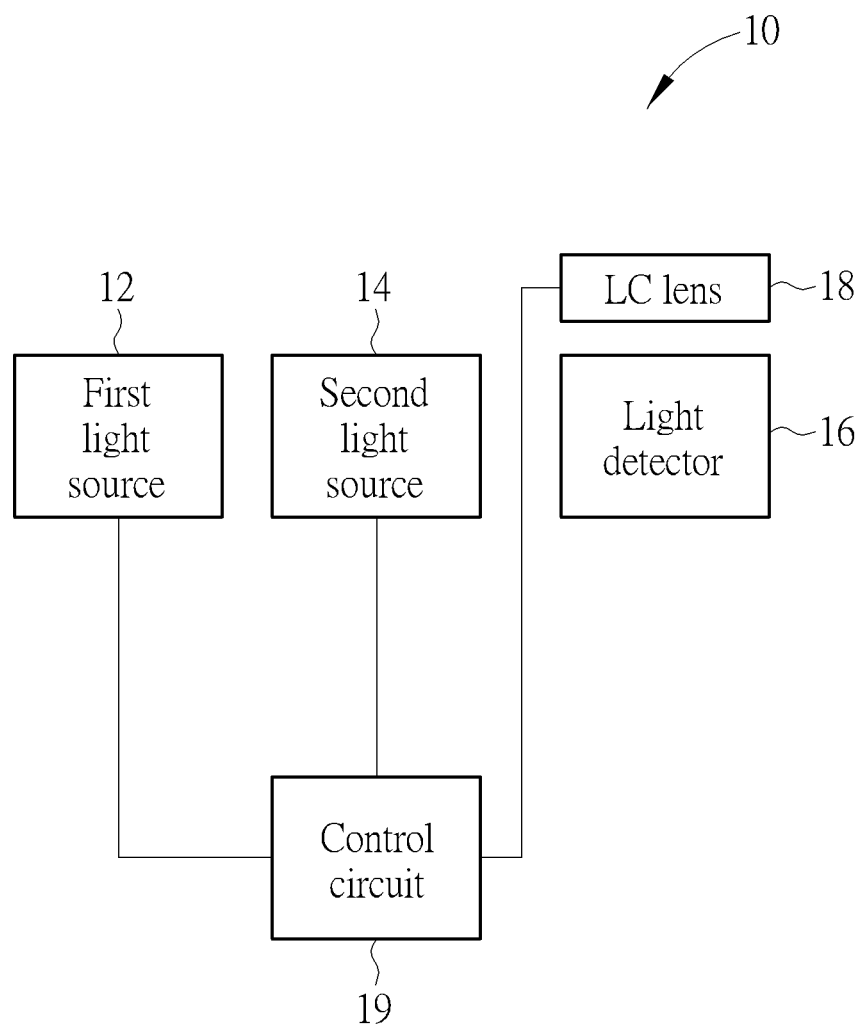
FIG. 1 is a diagram of a three-dimensional (3D) sensing system according to an embodiment of the present invention.

Please refer to FIG. 1. FIG. 1 is a diagram of a three-dimensional (3D) sensing system 10 according to an embodiment of the present invention. The 3D sensing system 10 comprises a first light source 12, a second light source 14, a light detector 16, a liquid crystal (LC) lens 18 and a control circuit 19. The first light source 12 is configured to emit polarized light with a polarization setting (e.g., waves in a particular polarization direction only) for projecting a structured light pattern on an object (shown in FIG. 2). The first light source 12 can be implemented by a 3D light emitter, and the structured light pattern can be implemented by a light dot pattern, and a wave length of the polarized light projected from the first light source 12 is 850 nm or 940 nm, but the present invention is not limited thereto. The second light source 14 is configured to emit unpolarized light (e.g., waves in all possible polarization directions) for illuminating the object (shown in FIG. 2). The second light source 14 can be implemented by a two-dimensional (2D) light emitter such as a flash light, but the present invention is not limited thereto. The light detector 16 is configured to detect light reflected from the object (shown in FIG. 2) and passing through the liquid crystal lens 18. The liquid crystal lens 18 is arranged in front of the light detector 16. More specifically, the liquid crystal lens 18 is in between the light detector 16 and the object (shown in FIG. 2) to achieve its designated function. In this embodiment, the liquid crystal lens 18 has a polarization state and a general state, and can be controlled to switch between the polarization state and the general state. The liquid crystal lens 18 in the polarization state allows incident light with the polarization setting (e.g., incident waves in a particular polarization direction) to pass through and block incident light without the polarization setting (e.g., incident waves not in the particular polarization direction) from passing through.

The control circuit 19 is electrically connected to the first light source 12, the second light source 14 and the liquid crystal lens 18, and is used to control an on/off state of each of the first light source 12 and the second light source 14, and further control an operation state of the liquid crystal lens 18. In this embodiment, the 3D sensing system 10 may support a 3D mode and a 2D mode. For example, when the 3D sensing system 10 is in the 3D mode, the control circuit 19 may be configured to turn on the first light source 12, turn off the second light source 14, and control the liquid crystal lens 18 to enter the polarization state. For another example, when the 3D sensing system 10 is in the 2D mode, the control circuit 19 may be configured to turn off the first light source 12, turn on the second light source 14, and control the liquid crystal lens 18 to enter the general state. However, this is for illustrative purposes only, and is not meant to be a limitation of the present invention. In practice, any 3D sensing system using the proposed design to mitigate influence of the ambient light under a 3D mode falls within the scope of the present invention.

Figure 2:
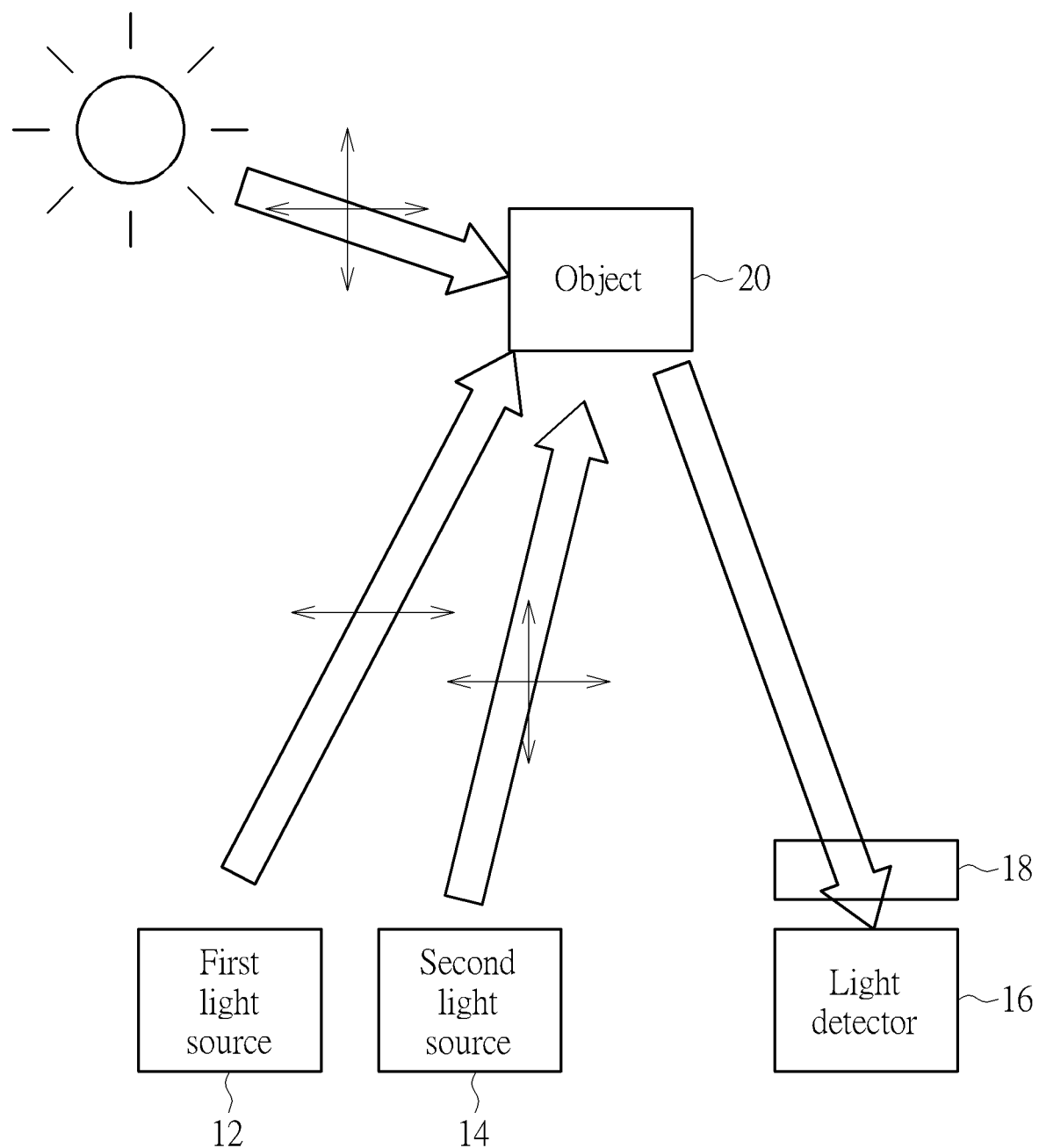
FIG. 2 is a diagram illustrating a first light source and a second light source of the 3D sensing system that project light on an object according to an embodiment of the present invention.
Figure 3:
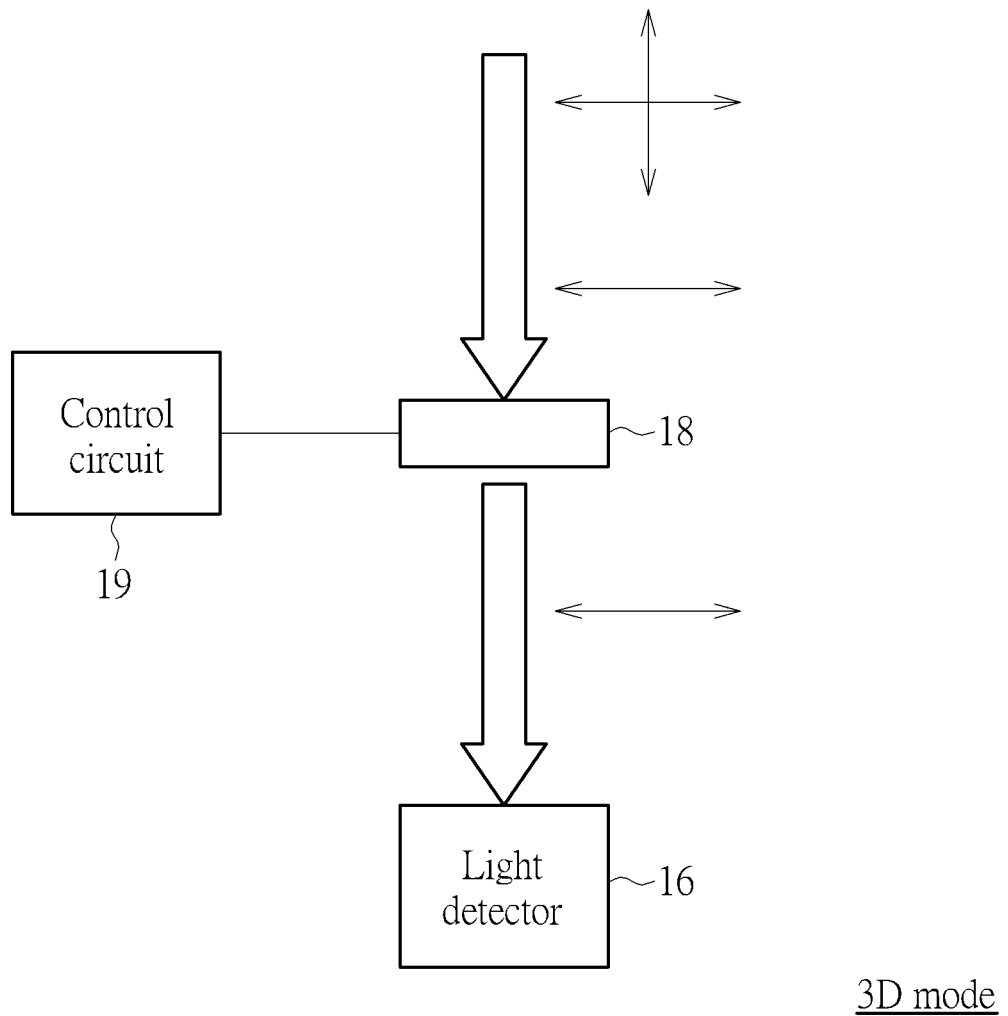
FIG. 3 is a diagram illustrating the 3D sensing system receiving light in a 3D mode according to an embodiment of the present invention.
Figure 4:
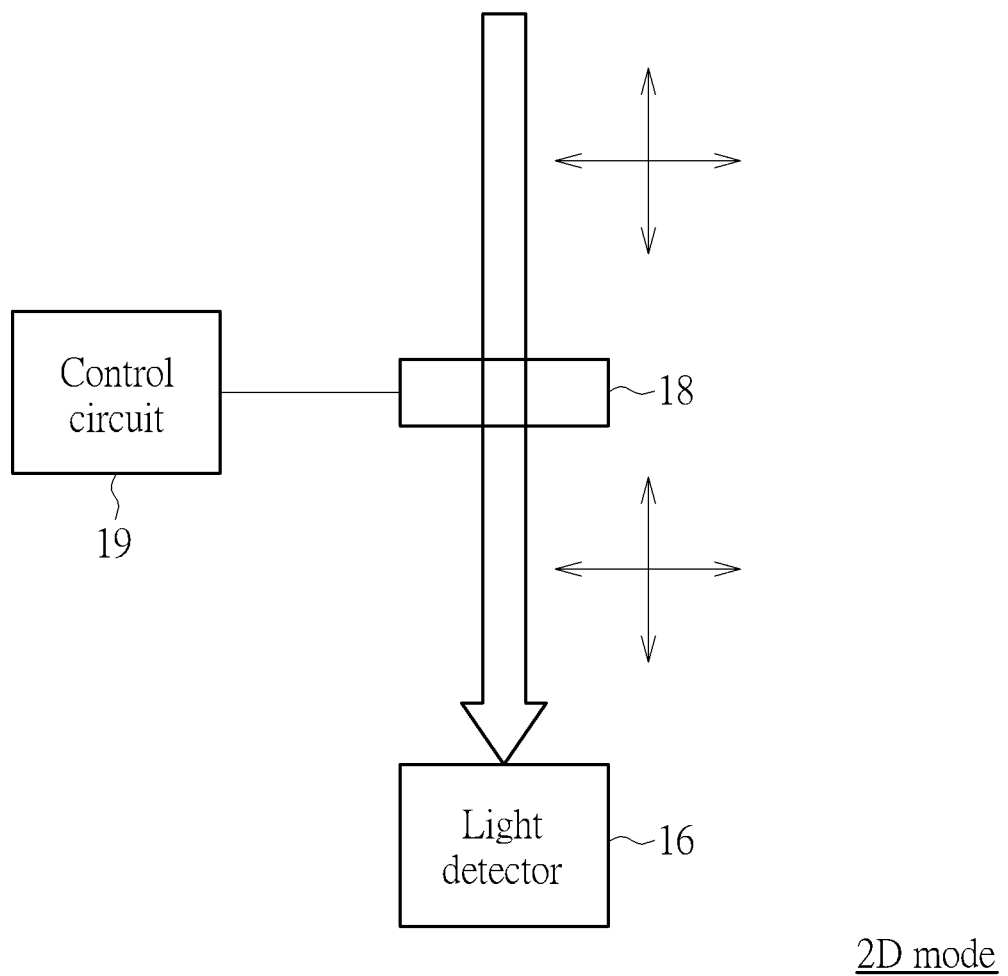
FIG. 4 is a diagram illustrating the 3D sensing system receiving light in a two-dimensional (2D) mode according to an embodiment of the present invention.

Please refer to FIG. 2 in conjunction with FIG. 1. FIG. 2 is a diagram illustrating the first light source 12 and the second light source 14 of the 3D sensing system 10 that project light on an object 20 according to an embodiment of the present invention. As mentioned above, the first light source 12 is configured to emit polarized light with a polarization setting (e.g., waves in a particular polarization direction only) for projecting a structured light pattern on an object 20, and the second light source 14 is configured to emit unpolarized light (e.g., waves in all possible polarization directions) for illuminating the object 20. Hereinafter, the polarized light projected from the first light source belongs to linear polarization with a particular polarization direction, but the present invention is not limited thereto. Alternatively, the polarized light projected from the first light source may belong to circular polarization or elliptical polarization. In FIG. 2 to FIG. 4, a transverse double arrow is used to represent linear polarized light, and two crossed double arrows are used to represent unpolarized light. It is noticed that ambient light from many sources, such as the sun, flames and incandescent lamps, is uniform light consisting of short wave trains with an equal mixture of polarizations in all possible directions; this is called unpolarized light. As shown in FIG. 2, the light from the second light source 14 and ambient light (such as the sunlight) are unpolarized light. Reflected light which is formed due to reflection of ambient light and the light emitted from the first light source 12 and the second light source 14 contributes to the incident light of the LC lens 18. Incident light of the LC lens 18 may include incident light with the polarization setting (e.g., waves in a polarization direction that same as the particular polarization direction of the polarized light emitted from the first light source 12), and may also incident light without the polarization setting (e.g., waves in a polarization direction different from the particular polarization direction of the polarized light emitted from the first light source 12). The LC lens 18 in a polarization state allows incident light with the polarization setting to pass through and block incident light without the polarization setting from passing through; and the LC lens 18 in the general state allows all incident light to pass through regardless of polarization.

The light detector 16 may detect the light reflected from the object 20 and passing through the LC lens 18 for object detection and identification. It is noticed that, the light from the second light source 14 and ambient light (such as the sunlight) is unpolarized light consisting of waves in all possible polarization directions. In other words, a part of the light from the second light source 14 and ambient light (such as the sunlight) may be waves with the same polarization setting (e.g., polarization direction) possessed by the polarized light emitted from the first light source 12. For example, assuming that the LC lens 18 in the polarization state allows linear polarized incident light in a horizontal polarization direction to pass through, a part of reflected sunlight with the linear polarization setting (e.g., waves in the horizontal polarization direction) may pass through the LC lens 18, and the rest of reflected sunlight without the linear polarization setting (e.g., waves in the vertical polarization direction) may be blocked by the LC lens 18. In other words, when the LC lens 18 is in the polarization state, a part of reflected ambient light and the whole reflected light derived from the polarized light emitted from the first light source 12 can pass through the LC lens 18; and when the LC lens 18 is in the general state, the whole of reflected ambient light, the whole of the reflected light derived from unpolarized light emitted from the second light source 14, and the whole reflected light derived from polarized light emitted from the first light source 12 can pass through the LC lens 18.

Please refer to FIG. 3. FIG. 3 is a diagram illustrating the 3D sensing system 10 receiving light in the 3D mode according to an embodiment of the present invention. As shown in FIG. 3, when the 3D sensing system 10 is in the 3D mode, the LC lens 18 is controlled to be in the polarization state by the control circuit 19. The incident light of the LC lens 18 has polarized light from the first light source 12 and unpolarized light from the ambient light source. The LC lens in the polarization state allows incident light with the polarization setting to pass through and block incident light without the polarization setting from passing through, such that only the light with the polarization setting passes through and becomes the incident light of the light detector 16. It is noticed that at this time, the light received by the light detector 16 is combined by the light with the polarization setting from the first light source 12 and partial light with the polarization setting from ambient light source.

According to the arrangement above, the 3D sensing system 10 can block the light without polarization setting in ambient light, to reduce the influence of ambient light on structured light. The light detector 16 may receive the structured light with less noise, such that the depth of each dot on the object 20 can be determined more accurately.

Please refer to FIG. 4. FIG. 4 is a diagram illustrating the 3D sensing system 10 receiving light in the 2D mode according to an embodiment of the present invention. As shown in FIG. 4, when the 3D sensing system 10 is in the 2D mode, the LC lens 18 is controlled to be in the general state by the control circuit 19. The LC lens 18 in the general state allows all incident light to pass through, such that the polarized light and the unpolarized light both can pass through. In other words, at this time, the ambient light and the light from the second light source 14 can all pass through the LC lens 18 to be received by the light detector 16. As a result, the 3D sensing system 10 in the 2D mode can illuminate the object 20 and still detect enough light to determine the 2D profile of the object 20. The LC lens 18 in the general state does not block any incident light.

Figure 5:
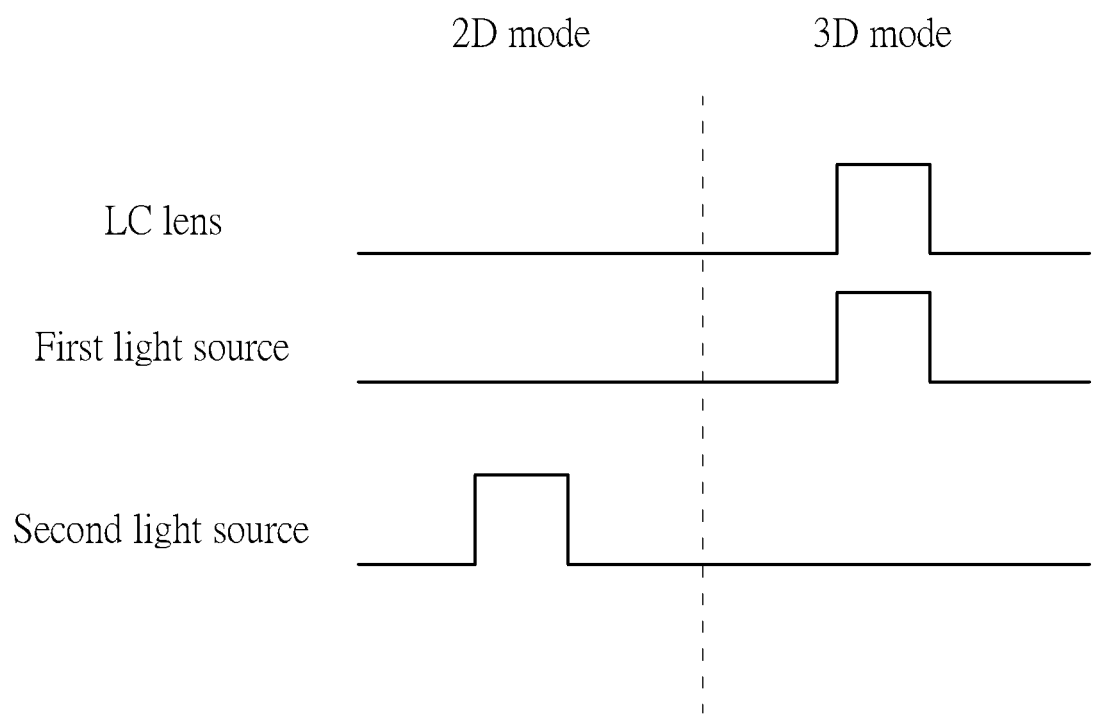
FIG. 5 is a timing diagram illustrating states of the first light source, the second light source and a liquid crystal lens of the 3D sensing system in the 3D mode and the 2D mode according to an embodiment of the present invention.

Please refer to FIG. 5. FIG. 5 is a timing diagram illustrating states of the first light source 12, the second light source 14 and the LC lens 18 of the 3D sensing system 10 in the 3D mode and the 2D mode according to an embodiment of the present invention. As shown in FIG. 5, when the 3D sensing system 10 is in the 2D mode, the first light source 12 is turned off and the second light source 14 is turned on to emit light, and the LC lens 18 is controlled in the general state with no polarization; and when the 3D sensing system 10 is in the 3D mode, the first light source 12 is turned on, in order to emit polarized light with the polarization setting for projecting the structured light pattern on the object 20, and the second light source 14 is turned off and the LC lens 18 is controlled in the polarization state to reduce the influence of ambient light on structured light. It is noticed that a pulse of the LC lens 18 in FIG. 5 represent the LC lens 18 is controlled in the polarization state.

Figure 6:
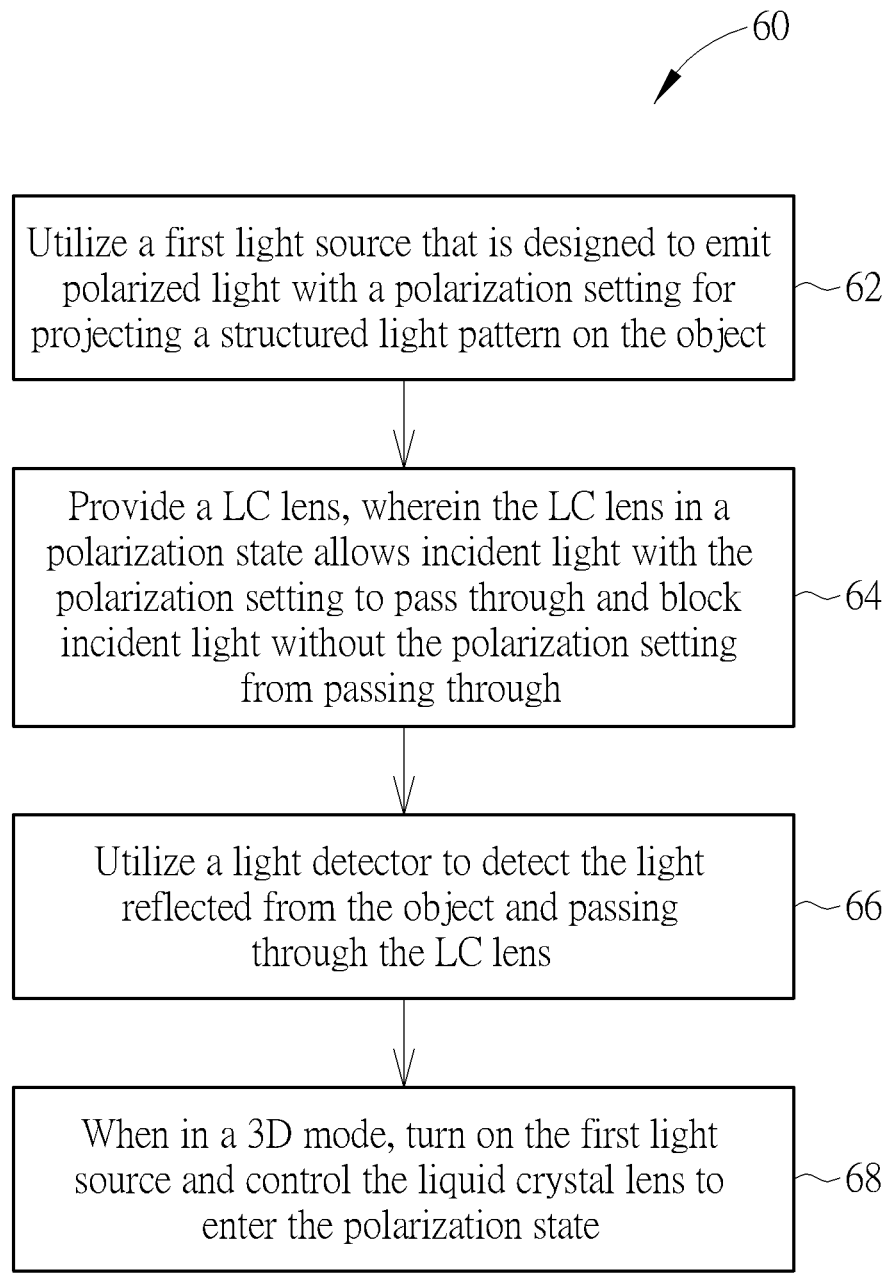
FIG. 6 is a flowchart of the method for determining a 3D profile of the object according to an embodiment of the present invention.

Please refer to FIG. 6. FIG. 6 is a flowchart 60 of the method for determining the 3D profile of the object according to an embodiment of the present invention. Provided that the result is substantially the same, the steps are not required to be executed in the exact order shown in FIG. 6. The method of the present invention comprises following steps:

Step 62: utilize a first light source that is designed to emit polarized light with a polarization setting for projecting a structured light pattern on the object;

Step 64: provide a liquid crystal lens, wherein the liquid crystal lens in a polarization state allows incident light with the polarization setting to pass through and block incident light without the polarization setting from passing through;

Step 66: utilize a light detector to detect the light reflected from the object and passing through the liquid crystal lens; and Step 68: when in a 3D mode, turn on the first light source and control the liquid crystal lens to enter the polarization state.

In contrast to the prior art, the disclosed 3D sensing system 10 is able to reduce the influence of ambient light (e.g., sunlight), such that the received information of light has less noise from the ambient light. The light dot pattern can be identified and analyzed more clearly, such that the structured light can accurately measure the depth of objects under a strong ambient light environment. As a result, the disclosed 3D sensing system 10 may greatly improve the accuracy of 3D sensing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-dimensional (3D) sensing system for determining a 3D profile of an object, the 3D sensing system comprising:
    a first light source, configured to emit polarized light with a polarization setting for projecting a structured light pattern on the object;
    a liquid crystal lens, wherein the liquid crystal lens in a polarization state allows incident light with the polarization setting to pass through and block incident light without the polarization setting from passing through;
    a light detector, configured to detect light reflected from the object and passing through the liquid crystal lens;
    a second light source, configured to emit unpolarized light for illuminating the object; and
    a control circuit, electrically connected to the first light source, the second light source and the liquid crystal lens, wherein when the 3D sensing system is in a 3D mode, the control circuit is configured to turn on the first light source, turn off the second light source, and control the liquid crystal lens to enter the polarization state;
    wherein when the 3D sensing system is in a two-dimensional (2D) mode, the control unit is configured to turn off the first light source, turn on the second light source, and control the liquid crystal lens to enter a general state, where the liquid crystal lens in the general state allows all incident light to pass through.

2. The 3D sensing system of claim 1, wherein the polarized light projected from the first light source belongs to linear polarization, circular polarization or elliptical polarization.

3. The 3D sensing system of claim 1, wherein a wave length of the polarized light projected from the first light source is 850 nm or 940 nm.

4. A method for determining a three-dimensional (3D) dimensional profile of an object, the method comprising:
    in response to a 3D mode being used, turning on a first light source to emit polarized light with a polarization setting for projecting a structured light pattern on the object, turning off a second light source used to emit unpolarized light for illuminating the object, and controlling a liquid crystal lens to enter a polarization state, wherein the liquid crystal lens in the polarization state allows incident light with the polarization setting to pass through and block incident light without the polarization setting from passing through;
    detecting light reflected from the object and passing through the liquid crystal lens; and
    in response to a two-dimensional (2D) mode being used, turning off the first light source, turning on the second light source, and controlling the liquid crystal lens to enter a general state, wherein the liquid crystal lens in the general state allows all incident light to pass through.

5. The method of claim 4, wherein the polarized light projected from the first light source belongs to linear polarization, circular polarization or elliptical polarization.

6. The method of claim 4, wherein a wave length of the polarized light projected from the first light source is 850 nm or 940 nm.

* * * * *